(12) United States Patent
Zimmer et al.

(10) Patent No.: US 9,654,464 B2
(45) Date of Patent: May 16, 2017

(54) DATA SECURITY

(71) Applicant: Intel Corporation, Santa Clara, CA (US)

(72) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/746,469

(22) Filed: Jun. 22, 2015

(65) Prior Publication Data

US 2016/0021099 A1 Jan. 21, 2016

Related U.S. Application Data

(63) Continuation of application No. 12/772,365, filed on May 3, 2010, now Pat. No. 9,135,470, which is a (Continued)

(51) Int. Cl.
*H04L 29/06* (2006.01)
*G06F 21/57* (2013.01)
(Continued)

(52) U.S. Cl.
CPC ...... *H04L 63/0823* (2013.01); *G06F 13/4068* (2013.01); *G06F 21/575* (2013.01);
(Continued)

(58) Field of Classification Search
CPC .......................... H04L 63/0823; G06F 13/4068
(Continued)

(56) References Cited

U.S. PATENT DOCUMENTS 5,373,512 A 12/1994 Brady
5,485,598 A 1/1996 Kashima et al.
(Continued)

FOREIGN PATENT DOCUMENTS

DE 3613827 A1 10/1987
EP 0421409 A 4/1991
(Continued)

OTHER PUBLICATIONS

Ming Li; Data Security and Privacy Inwireless Body Area Networks; IEEE Wireless Communications o Feb. 2010; p. 52-58.*
(Continued)

*Primary Examiner* — Monjour Rahim
(74) *Attorney, Agent, or Firm* — Blakely, Sokoloff, Taylor & Zafman LLP

(57) ABSTRACT

In one embodiment, a method is provided that may include one or more operations. One of these operations may include, in response, at least in part, to a request to store input data in storage, encrypting, based least in part upon one or more keys, the input data to generate output data to store in the storage. The one or more keys may be authorized by a remote authority. Alternatively or additionally, another of these operations may include, in response, at least in part, to a request to retrieve the input data from the storage, decrypting, based at least in part upon the at least one key, the output data. Many modifications, variations, and alternatives are possible without departing from this embodiment.

22 Claims, 2 Drawing Sheets

Related U.S. Application Data continuation of application No. 10/970,405, filed on Oct. 20, 2004, now Pat. No. 7,711,965.

(51) Int. Cl.
  *G06F 21/71* (2013.01)
  *G06F 21/72* (2013.01)
  *G06F 21/80* (2013.01)
  *G06F 13/40* (2006.01)
  *H04L 9/32* (2006.01)

(52) U.S. Cl.
  CPC .............. *G06F 21/71* (2013.01); *G06F 21/72* (2013.01); *G06F 21/80* (2013.01); *H04L 9/3268* (2013.01); *H04L 63/0435* (2013.01); *H04L 63/061* (2013.01); *H04L 63/08* (2013.01); *G06F 2221/2107* (2013.01); *G06F 2221/2115* (2013.01)

(58) Field of Classification Search
  USPC ........................................................ 713/158
  See application file for complete search history.

(56) References Cited

U.S. PATENT DOCUMENTS

| | | | |
|---|---|---|---|
| 5,522,032 | A | 5/1996 | Franaszek et al. |
| 5,640,506 | A | 6/1997 | Duffy |
| 5,883,909 | A | 3/1999 | DeKoning et al. |
| 5,931,947 | A | 8/1999 | Burns et al. |
| 6,097,818 | A | 8/2000 | Saito |
| 6,134,660 | A | 10/2000 | Boneh et al. |
| 6,157,721 | A | 12/2000 | Shear et al. |
| 6,170,058 | B1 | 1/2001 | Kausik |
| 6,230,266 | B1* | 5/2001 | Perlman ............... H04L 9/3268 713/156 |
| 6,260,120 | B1 | 7/2001 | Blumenau et al. |
| 6,282,650 | B1 | 8/2001 | Davis |
| 6,336,187 | B1 | 1/2002 | Kern et al. |
| 6,446,237 | B1 | 9/2002 | Menon |
| 6,510,521 | B1 | 1/2003 | Albrecht et al. |
| 6,546,492 | B1* | 4/2003 | Walker ..................... G06F 8/65 726/3 |
| 6,807,649 | B1 | 10/2004 | Murthy et al. |
| 6,920,154 | B1 | 7/2005 | Achler |
| 7,054,447 | B1* | 5/2006 | Price, III ............... H04L 63/06 380/278 |
| 7,069,435 | B2 | 6/2006 | Sandhu et al. |
| 7,140,044 | B2 | 11/2006 | Redlich et al. |
| 7,302,571 | B2 | 11/2007 | Noble et al. |
| 7,337,331 | B2* | 2/2008 | Yoshida ............... G06F 11/1464 711/162 |
| 7,356,842 | B2 | 4/2008 | Canard et al. |
| 7,949,606 | B1* | 5/2011 | Sweet .................... G06Q 30/06 705/51 |
| 8,307,098 | B1 | 11/2012 | Atkins et al. |
| 2002/0078346 | A1 | 6/2002 | Sandhu et al. |
| 2002/0114453 | A1 | 8/2002 | Bartholet et al. |
| 2002/0174351 | A1 | 11/2002 | Jeong et al. |
| 2003/0070083 | A1 | 4/2003 | Nessler |
| 2003/0084290 | A1 | 5/2003 | Murty et al. |
| 2003/0105967 | A1* | 6/2003 | Nam ................... G06F 12/1408 713/189 |
| 2003/0167395 | A1 | 9/2003 | Chang et al. |
| 2004/0068650 | A1* | 4/2004 | Resnitzky .......... H04L 63/0428 713/155 |
| 2004/0243814 | A1 | 12/2004 | Nakano et al. |
| 2005/0021969 | A1 | 1/2005 | Williams et al. |
| 2005/0071651 | A1 | 3/2005 | Aguilar et al. |
| 2005/0239504 | A1 | 10/2005 | Ishii et al. |
| 2006/0111133 | A1 | 5/2006 | Hirano et al. |
| 2006/0224902 | A1 | 10/2006 | Bolt |
| 2006/0224903 | A1 | 10/2006 | Ginter et al. |
| 2006/0233364 | A1* | 10/2006 | Camenisch ........... H04L 9/3255 380/44 |
| 2007/0016805 | A1 | 1/2007 | Klein |
| 2007/0067647 | A1 | 3/2007 | Klein |
| 2007/0074047 | A1 | 3/2007 | Metzger et al. |
| 2007/0079145 | A1 | 4/2007 | Saito |
| 2007/0088961 | A1 | 4/2007 | Asano et al. |
| 2008/0098212 | A1 | 4/2008 | Helms et al. |

FOREIGN PATENT DOCUMENTS

| | | |
|---|---|---|
| EP | 0905693 | 3/1999 |
| JP | 2005324939 | 12/1993 |
| JP | 08044632 | 2/1996 |
| JP | 10275115 | 10/1998 |
| JP | 10326154 | 12/1998 |
| JP | 2000228060 | 8/2000 |
| JP | 2001042769 | 2/2001 |
| JP | 2001350405 | 12/2001 |
| JP | 2002351747 | 12/2002 |
| JP | 2003092565 | 3/2003 |
| JP | 2003152715 | 5/2003 |
| JP | 05143247 | 6/2003 |
| JP | 2004048742 | 2/2004 |
| WO | WO-03019438 | 3/2003 |

OTHER PUBLICATIONS

Final Office Action for U.S. Appl. No. 10/970,405 mailed on Jan. 12, 2009, 14 pages.
Non-Final Office Action for U.S. Appl. No. 10/970,405 mailed Feb. 8, 2008, 15 pages.
Second Non-Final Office Action for U.S. Appl. No. 10/970,405 mailed Jun. 10, 2009, 12 pages.
Notice of Allowance for U.S. Appl. No. 10/970,405 mailed Dec. 14, 2009, 5 pages.
Final Office Action for U.S. Appl. No. 12/772,365 mailed on Mar. 27, 2014, 11 pages.
Third Non-Final Office Action for U.S. Appl. No. 12/772,365 mailed Sep. 5, 2013, 10 pages.
Non-Final Office Action for U.S. Appl. No. 12/772,365 mailed on Jun. 29, 2011, 10 pages.
Second Non-Final Office Action for U.S. Appl. No. 12/772,365 mailed Jan. 31, 2013, 11 pages.
First Notice of Allowance for U.S. Appl. No. 12/772,365 mailed Mar. 16, 2014, 10 pages.
Second Notice of Allowance for U.S. Appl. No. 12/772,365 mailed Apr. 28, 2015, 6 pages.
Third Notice of Allowance for U.S. Appl. No. 12/772,365 mailed Aug. 17, 2015, 6 pages.
First Office Action (+English Translation) in Chinese Application No. 200580033440.6 mailed Mar. 30, 2009, 12 pages.
Office Action (+English Translation) in Chinese Application No. 200580033440.6 mailed Sep. 25, 2009, 5 pages.
Decision to Grant in European Application No. 05810186.6-1870/ 1805572 mailed Jul. 2, 2015, 2 pages.
Second Office Action for European Application No. 05810186.6-2212 mailed on May 17, 2011, 5 pages.
Office Action for European Application No. 05810186.6-2212 mailed on Feb. 20, 2009, 7 pages.
First Notice for Reasons for Rejection (+English Translation) for Japanese Application No. 2007-537940 mailed Jun. 15, 2010, 6 pages.
Decision of Rejection (+English Translation) for Japanese Application No. 2007-537940 mailed Oct. 5, 2010, 3 pages.
Notice of Allowance (+English Translation) for Taiwanese Application No. 94136176 mailed May 15, 2009, 3 pages.
Patterson, David A., et al., "A Case for Redundant Arrays of Inexpensive Disks (RAID)", Computer Science Division, Department of Electrical Engineering and Computer Sciences, Berkeley, CA., XP000996447, (Jun. 1, 1988), 109-116.
Smith, John , "Carnegie Mellon Data and Computer Security", Carnegie Mellon University, vol. 7, 1-23.
International Preliminary Report for PCT Application No. PCT/US2005/037102 mailed on May 3, 2007, 7 pages.

(56) References Cited

OTHER PUBLICATIONS

International Search Report and Written Opinion for PCT Application No. PCT/US2005/037102 mailed May 24, 2006, 15 pgs.

* cited by examiner

DATA SECURITY

CROSS-REFERENCE TO RELATED APPLICATIONS

The subject application is a continuation of, claims the benefit of and priority to previously filed U.S. patent application Ser. No. 12/772,365, filed May 3, 2010, which is a continuation of U.S. patent application Ser. No. 10/970,405 filed Oct. 20, 2004, issued as U.S. Pat. No. 7,711,965 on May 4, 2010, which is related to U.S. patent application Ser. No. 12/474,224 filed May 28, 2009, issued as U.S. Pat. No. 8,127,150, Feb. 28, 2012, which is a continuation of U.S. Pat. No. 7,562,230 issued Jul. 14, 2009. The subject application and this related application are commonly assigned to the same Assignee.

FIELD

The subject application is related to the field of data security.

BACKGROUND

In a typical corporate information technology and/or computing arrangement, a host owned by a corporation may be assigned to an employee of the corporation for use by the employee in carrying out the employee's work for the corporation. In this typical arrangement, the host executes an operating system and comprises mass storage. The employee may issue, via the operating system's user interface, data storage and retrieval requests to the host. In response to such data storage and retrieval requests, data may be stored in, and retrieved from, respectively, the mass storage by the host. In this conventional arrangement, the data is stored in, and retrieved from, the mass storage as plaintext. In order to validate the employee's authorization to store data in and/or retrieve data from the mass storage, prior to permitting the employee to issue the data storage and/or retrieval requests to the host via the operating system, the operating system may require the employee to furnish, during a user log-in process, a valid user password.

In this typical arrangement, the employee has possession of the host. However, if an unauthorized person gains access to the host, the unauthorized person may be able to remove the mass storage from the host. Thereafter, the unauthorized person may be able to couple the mass storage to another host, and issue data storage and retrieval requests to the mass storage via the other host's operating system. Unfortunately, since, in this conventional arrangement, the data is stored in, and retrieved from the mass storage as plaintext, this may permit the unauthorized person to be able to retrieve data from and/or modify the data in the mass storage, despite the fact that the unauthorized person lacks the company's authorization to do so.

One proposed solution has been to use the host's operating system to encrypt, based on an encryption key generated by the operating system, the data stored in the mass storage. For example, using the key, the operating system may, in response to an authorized user's data storage request, encrypt plaintext data and store the thus encrypted data in the mass storage. Likewise, using the key, the operating system may, in response to an authorized user's data retrieval request, retrieve encrypted data from the mass storage and decrypt the encrypted data to produce plaintext data to be presented to the user. However, after initially authorizing an employee's access to the data stored in the mass storage, the corporation later may desire to restrict the employee's access to the data. Unfortunately, since data encryption and decryption is performed by the operating system, the employee has possession of the host and its mass storage, and the employee presumably still has knowledge of a valid operating system user password, unless and until the corporation regains possession from the employee of the mass storage, the employee may continue to access the data stored in the mass storage, via the operating system. Thus, this proposed solution may be unable to provide sufficient data security.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

Figure 1:
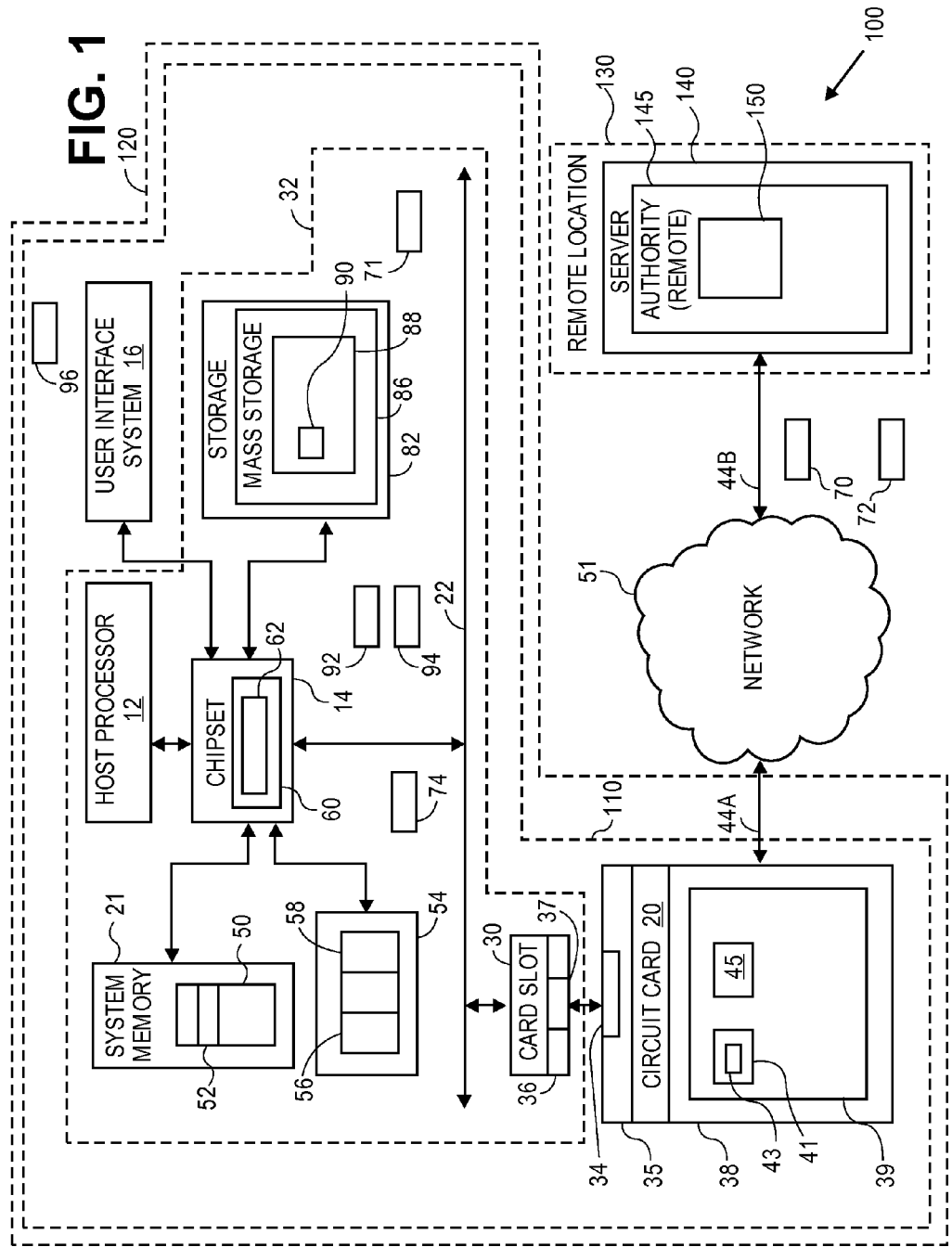
FIG. 1 is diagram that illustrates a system embodiment.

FIG. 1 illustrates a system embodiment 100. System 100 may comprise host 110. As used herein, a "host" means a system that comprises at least a processor and memory. As used herein, a "processor" means circuitry capable of executing one or more instructions. Host 110 may be geographically located at a first location 120. Host 110 may comprise a host processor 12 coupled to a chipset 14. Host processor 12 may comprise, for example, an Intel® Pentium® IV and/or Itanium® microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Host 110 also may comprise, for example, user interface system 16, bus system 22, circuit card slot 30, system memory 21, chipset 14, memory 54, storage 82, and circuit card 20. Chipset 14 may comprise a bridge/hub system that may couple host processor 12, system memory 21, and user interface system 16 to each other. Chipset 14 may also include an input/output (I/O) bridge/hub system (not shown) that may couple the host bridge/bus system, storage 82, and memory 54 to bus 22. Chipset 14 may comprise one or more integrated circuit chips, such as those selected from integrated circuit chipsets commercially available from the assignee of the subject application (e.g., graphics memory and I/O controller hub chipsets), although one or more other integrated circuit chips may also, or alternatively be used, without departing from this embodiment. Additionally or alternatively, chipset 14 may comprise an integrated circuit 60 that may comprise storage controller 62 that may be capable of controlling and/or monitoring, at least in part, the operation of storage 82. User interface system 16 may comprise, e.g., a keyboard, pointing device, and display system that may permit a human user to input commands to, and monitor the operation of, system 100.

Memory 54 and memory 21 each may comprise one or more of the following types of machine-readable memories: semiconductor firmware memory, programmable memory, non-volatile memory, read only memory, electrically programmable memory, random access memory, flash memory, magnetic disk memory, and/or optical disk memory. Either additionally or alternatively, memory 54 and/or memory 21 may comprise other and/or later-developed types of computer-readable memory.

Bus 22 may comprise a bus that complies and/or is compatible with the Peripheral Component Interconnect (PCI) Express™ Base Specification Revision 1.0, published Jul. 22, 2002, available from the PCI Special Interest Group, Portland, Oreg., U.S.A., and/or later-developed version of said Specification (hereinafter collectively or singly referred to as a "PCI Express™ bus"). Alternatively, bus 22 may comprise other types and configurations of bus systems, without departing from this embodiment.

System embodiment 100 may comprise storage 82. Storage 82 may comprise mass storage 86 that may comprise one or more storage devices 88. One or more storage devices 88 each may be or comprise one or more respective mass storage devices. As used herein, the terms "storage" and "storage device" may be used interchangeably to mean one or more apparatus into, and/or from which, data and/or commands may be stored and retrieved, respectively. Also, as used herein, the terms "mass storage" and "mass storage device" may be used interchangeably to mean one or more storage devices capable of non-volatile storage of data and/or commands, and, for example, may include, without limitation, one or more magnetic, optical, and/or semiconductor storage devices, such as, for example, in this embodiment, one or more disk storage devices.

Circuit card slot 30 may comprise, for example, a PCI Express™ compatible or compliant expansion slot or interface 36. Interface 36 may comprise a bus connector 37 that may be electrically and mechanically mated with a mating bus connector 34 that may be comprised in a bus expansion slot or interface 35 in circuit card 20.

As used herein, "circuitry" may comprise, for example, singly or in any combination, analog circuitry, digital circuitry, logic circuitry, hardwired circuitry, programmable circuitry, state machine circuitry, and/or memory that may comprise machine-executable instructions that may be executed by programmable circuitry. Also as used herein, an "integrated circuit" means one or more semiconductor devices and/or one or more microelectronic devices, such as, for example, a semiconductor integrated circuit chip. In this embodiment, circuit card 20 may comprise operative circuitry 38. Operative circuitry 38 may comprise, for example, integrated circuit 39. Integrated circuit 39 may comprise microcontroller 41 and memory 45. Microcontroller 41 may comprise one or more processors (not shown).

Memory 45 may comprise one or more of the following types of machine-readable memories: semiconductor firmware memory, programmable memory, non-volatile memory, read only memory, electrically programmable memory, random access memory, flash memory, magnetic disk memory, and/or optical disk memory. Either additionally or alternatively, memory 45 may comprise other and/or later-developed types of computer-readable memory.

Machine-executable instructions may be stored in memory 45. These instructions may be accessed and executed by operative circuitry 38, integrated circuit 39, microcontroller 41, and/or circuitry 43. When so executed, these instructions may result in card 20, circuitry 38, integrated circuit 39, microcontroller 41, and/or circuitry 43, performing the operations described herein as being performed by card 20, circuitry 38, integrated circuit 39, microcontroller 41, and/or circuitry 43.

Slot 30 and card 20 may be constructed to permit card 20 to be inserted into slot 30. When card 20 is properly inserted into slot 30, connectors 34 and 37 may become electrically and mechanically coupled to each other. When connectors 34 and 37 are so coupled to each other, circuitry 38 may become electrically coupled to bus 22.

Alternatively, some or all of operative circuitry 38, integrated circuit 39, memory 45, microcontroller 41, and/or circuitry 43 may not be comprised in card 20, but instead, may be comprised in one or more other structures, systems, and/or devices that may be, for example, comprised in motherboard 32, coupled to bus 22, and exchange data and/or commands with other components (such as, for example, chipset 14, integrated circuit 60, controller 62, network 51, server 140, remote authority 145, one or more agents 150, and/or other and/or additional components) in system 100. For example, in this alternative, some or all of operative circuitry 38, integrated circuit 39, memory 45, microcontroller 41, and/or circuitry 43 may be comprised in one or more integrated circuits that may be comprised in chipset 14 and coupled to server 140 via network 51. Also alternatively, some or all of operative circuitry 38, integrated circuit 39, memory 45, microcontroller 41, and/or circuitry 43 may not be comprised in chipset 14, but may be comprised in motherboard 32 and coupled to server 140 via network 51. Many alternatives, modifications, and variations are possible.

Processor 12, system memory 21, chipset 14, bus 22, circuit card slot 30, and memory 54 may be comprised in a single circuit board, such as, for example, system motherboard 32. Storage 82 may be mounted to motherboard 32, or alternatively, may not be mounted to motherboard 32, without departing from this embodiment. The number of storage devices 88 in system embodiment 100 may vary without departing from this embodiment.

Additionally, without departing from this embodiment, storage devices 88 may be configured as a (not shown) redundant array of inexpensive disks (RAID) that may implement a RAID level of 0, 1, or greater than 1. Depending upon, for example, the RAID level implemented in this RAID, the number of storage devices 88 that may be comprised in the RAID may vary so as to permit the number of storage devices 88 to be at least sufficient to implement the RAID level implemented in the RAID.

Chipset 14, controller 62, and/or integrated circuit 60 may exchange data and/or commands with storage 82 in accordance with one or more of a variety of different communication protocols, e.g., a Small Computer Systems Interface (SCSI), Fibre Channel (FC), Ethernet, Serial Advanced Technology Attachment (S-ATA), and/or Transmission Control Protocol/Internet Protocol (TCP/IP) communication protocol. Of course, alternatively and/or additionally, chipset 14, controller 62, and/or integrated circuit 60 may exchange data and/or commands with storage 82 in accordance with other and/or additional communication protocols, without departing from this embodiment.

In accordance with this embodiment, the SCSI protocol in accordance with which chipset 14, controller 62, and/or integrated circuit 60 may exchange data and/or commands with storage 82 may comply or be compatible with the protocol described in American National Standards Institute (ANSI) Small Computer Systems Interface-2 (SCSI-2) ANSI X3.131-1994 Specification. If chipset 14, controller 62, and/or integrated circuit 60 exchange data and/or commands with storage 82 in accordance with an FC protocol, the FC protocol may comply or be compatible with the protocol described in ANSI Standard Fibre Channel (FC) Physical and Signaling Interface-3 X3.303:1998 Specification. If chipset 14, controller 62, and/or integrated circuit 60 exchange data and/or commands with storage 82 in accordance with an Ethernet protocol, the Ethernet protocol may comply or be compatible with the protocol described in Institute of Electrical and Electronics Engineers, Inc. (IEEE) Std 802.3, 2000 Edition, published on Oct. 20, 2000. If chipset 14, controller 62, and/or integrated circuit 60 exchange data and/or commands with storage 82 in accordance with S-ATA protocol, the S-ATA protocol may comply or be compatible with the protocol described in "Serial ATA: High Speed Serialized AT Attachment," Revision 1.0, published on Aug. 29, 2001 by the Serial ATA Working Group. Also, if chipset 14, controller 62, and/or integrated circuit 60 may exchange data and/or commands with storage 82 in accordance with TCP/IP, the TCP/IP may comply or be compatible with the protocols described in Internet Engineering Task Force (IETF) Request For Comments (RFC) 791 and 793, published September 1981.

In this embodiment, circuitry 38 may be coupled, via one or more network communication links 44A, to communication network 51. Additionally, system embodiment 100 may comprise server 140 that may be coupled, via one or more network communication links 44B, to communication network 51. Circuitry 38 may be capable of exchanging data and/or commands via one or more links 44A, network 51, and one or more links 44B in accordance with one or more of a variety of different communication protocols, e.g., Ethernet and/or TCP/IP communication protocols.

Server 140 may comprise a remote authority (e.g., a remote management authority) 145. Server 140 may be located at a location 130 that is geographically remote from the location 120 of host 110. Remote authority 145 may comprise one or more program processes including one or more agents 150 that may implement and/or carry out one or more management and/or authorization functions described herein. For example, in this embodiment, server 140 may comprise one or more processors (not shown) that may be capable of executing one or more machine-executable instructions that may result in the spawning and maintaining of agents 150 in server 140.

Figure 2:
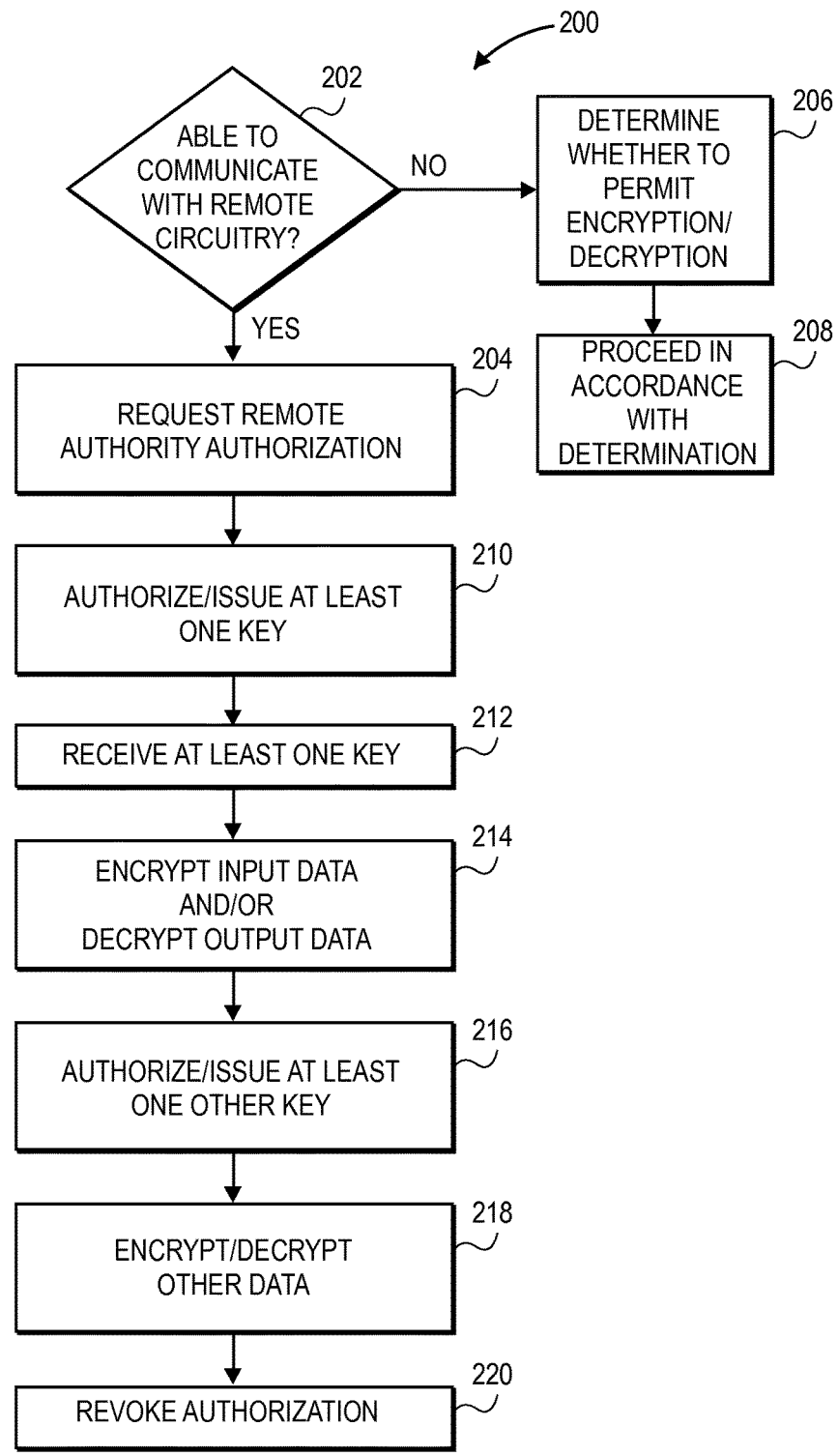
FIG. 2 is a flowchart that illustrates operations that may be performed according to an embodiment.

With reference now being made to FIG. 2, operations 200 that may be carried out in system 100 according to an embodiment will be described. After, for example, a reset of host 110, host processor 12 may boot an operating system by executing operating system instructions that may result, at least in part, in operating system 50 being loaded, at least in part, into memory 21. Operating system 50 may comprise one or more operating system processes 52.

However, after the reset of host 110, and prior to the booting of the operating system, executing of the operating system instructions, and/or loading of operating system 50 into system memory 21, microcontroller 41 may execute one or more basic input/output system (BIOS) instructions 56 that may be stored in memory 54. In this embodiment, the execution of these BIOS instructions 56 by microcontroller 41 may result, at least in part, in microcontroller 41 and/or circuitry 38 determining whether microcontroller 41 and/or circuitry 38 is able to communicate, via network 51, with server 140, remote authority 145, and/or one or more agents 150, as illustrated by operation 202 in FIG. 2. For example, as part of operation 202, circuitry 38 may issue to server 140, remote authority 145, and/or one or more agents 150, via network 51, one or more predetermined packets that, if received by server 140, remote authority 145, and/or one or more agents, are expected to result in server 140, remote authority 145, and/or one or more agents 150, in response, at least in part, to such one or more packets, issuing to circuitry 38 via network 51 one or more other predetermined packets. Thereafter, if circuitry 38 receives these one or more other predetermined packets, circuitry 38 and/or controller 41 may determine, as a result of operation 202, that circuitry 38 and/or controller 41 is able to communicate, via network 51, with server 140, remote authority 145, and/or one or more agents 150. As used herein, a "packet" comprises one or more symbols and/or values that may encode and/or represent, for example, data and/or one or more commands.

If, as a result of operation 202, circuitry 38 and/or controller 41 determines that circuitry 38 and/or controller 41 is able to communicate, via network 51, with server 140, remote authority 145, and/or one or more agents 150, circuitry 38 and/or controller 41 may request authorization by the remote authority 145 of at least one key 70, as illustrated by operation 204. For example, in this embodiment, as part of operation 204, circuitry 38 and/or controller 41 may issue to server 140, remote authority 145, and/or one or more agents 150, via network 51, one or more packets that may comprise, represent, and/or embody a request that remote authority 145 authorize and issue to circuitry 38 one or more keys 70.

In response, at least in part, to this request from circuitry 38 and/or controller 41, authority 145 and/or one or more processes 150 may generate, authorize, and issue to network 51, and thence, to circuitry 38 one or more keys 70, as illustrated by operation 210. As used herein, a "key" means one or more strings, symbols, and/or values based, at least in part, upon which data may be encrypted and/or decrypted, at least in part. For example, in this embodiment one or more keys 70 may comprise one or more symmetric keys; however, many alternatives are possible without departing from this embodiment.

Thereafter, circuitry 38 and/or controller 41 may receive, via network 51, at least one key 70, as illustrated by operation 212. In response, at least in part, to receipt of one or more keys 70, circuitry 38 and/or controller 41 may store in a portion 58 of memory 54 one or more keys 70.

After processor 12 has loaded, at least in part, operating system 50 in memory 21, and circuitry 38 and/or controller 41 has stored in memory 54 one or more keys 70, a human user (not shown) of host 110 may issue a request, via user interface system 16, to one or more processes 52 to store in storage 82 input data 92. In response, at least in part, to this request from the user, one or more processes 52 may issue to controller 62 a corresponding request to store in storage 82 input data 92.

In response, at least in part, to this request from one or more processes 52, controller 62 may redirect and/or forward the request and/or the input data 92 to microcontroller 41. In response, at least in part, to the request and/or input data 92, circuitry 43 may encrypt input data 92, based at least in part upon one or more keys 70 stored in memory 54 and in accordance, at least in part, with one or more conventional data encryption techniques (such as, for example, one or more symmetric encryption algorithms), to generate encrypted output data 94, as illustrated by operation 214. For example, in this embodiment, one or more keys 70 and these one or more symmetric encryption algorithms may comply and/or be compatible with, for example, Data Encryption Standard (DES), FIPS 46, dated January 1977, Advanced Encryption Standard (AES), FIPS 197, November 2001, and/or other and/or additional encryption algorithms. After circuitry 43 has generated encrypted output data 94, circuitry 38 may issue encrypted output data 94 to controller 62. In response, at least in part, to output data 94, controller 62 may issue a request to storage 82 that corresponds to the request that was previously issued to controller 62 by one or more processes 52, with the exception that the request issued to storage 82 by controller 62 requests that output data 94 (not input data 92) be stored in storage 82. In response, at least in part, to this request from controller 62, storage 82 may store output data 94 in one or more storage devices 88 in accordance with the request from controller 62.

Alternatively or additionally, after processor 12 has loaded, at least in part, operating system 50 in memory 21, and circuitry 38 and/or controller 41 has stored in memory 54 one or more keys 70, the user of host 110 may issue a request, via user interface system 16, to one or more processes 52 to retrieve from storage 82 data 92. In response, at least in part, to this request from the user, one or more processes 52 may issue to controller 62 a corresponding request to retrieve from storage 82 data 92.

In response, at least in part, to this request from one or more processes 52, controller 62 may retrieve data 90 from storage 82, and may forward data 90 to microcontroller 41. In accordance with this embodiment, data 90 may be encrypted data that was previously generated by circuitry 43 based at least in part upon one or more keys 70 and in accordance, at least in part, with one or more conventional encryption algorithms, for example, of the type described previously.

In response, at least in part, to data 90, circuitry 43 may decrypt, based at least in part upon one or more keys 70 and in accordance, at least in part, with these one or more conventional encryption algorithms, data 90 to generate data 92, as illustrated by operation 214. After circuitry 43 has generated data 92, circuitry 38 may issue data 92 to controller 62. In response, at least in part, to data 92, controller 62 may issue data 92 to one or more processes 52, and thereafter, one or more processes 52 may present data 92 to the user in accordance with the user's data retrieval request.

In this embodiment, after remote authority 145 and/or one or more processes 150 have authorized and issued one or more keys 70 to circuitry 38 and/or controller 41, remote authority 145 and/or one or more processes 150 may periodically authorize and issue to circuitry 38 and/or controller 41 one or more additional keys, such as, for example, one or more additional keys 72, as illustrated by operation 216. For example, in this embodiment, each key authorized and issued by remote authority 145 and/or one or more processes 150 may be associated with a predetermined expiration date encoded into the key. After a respective key's expiration date has passed, circuitry 43 may consider the authorization of the key as having expired and/or as having been revoked by authority 145 and/or one or more processes 150, and accordingly, circuitry 43 may no longer encrypt and/or decrypt data using that key. Accordingly, prior to the expiration of one or more keys 70, remote authority 145 and/or one or more processes 150 may authorize and issue to circuitry 38 and/or controller 41 one or more additional keys 72. Thereafter, prior to expiration of one or more keys 72, remote authority 145 and/or one or more processes 150 may authorize and issue to circuitry 38 one or more yet additional keys (not shown); consistent with this process, additional keys may be authorized and issued by remote authority 145 and/or one or more processes 150 at additional predetermined periodic intervals prior to the keys' expiration dates.

In response to receipt of one or more keys 72, circuitry 38 and/or controller 41 may store in portion 58 of memory 54 one or more keys 72. Thereafter, circuitry 43 may decrypt the data stored in storage 82 that was previously encrypted based at least in part upon one or more keys 70. After decrypting this data, circuitry 43 may encrypt, based at least in part upon one or more keys 72, the thus decrypted data. The newly encrypted data then may be stored in storage 82.

Alternatively, some or all of the data stored in storage 82 that was previously encrypted based at least in part upon one or more keys 70 may remain, as stored in storage 82, encrypted based at least in part upon one or more keys 70. In this alternative, if the user issues requests to retrieve data from storage 82 that implicates one or more portions of this encrypted data, these portions may be decrypted by circuitry 38, based at least in part upon one or more keys 70, for presentation to the user.

After processor 12 has loaded, at least in part, operating system 50 in memory 21, and circuitry 38 and/or controller 41 has stored in memory 54 one or more keys 72, the user of host 110 may issue a request, via user interface system 16, to one or more processes 52 to store in storage 82 additional input data 74. In response, at least in part, to this request from the user, one or more processes 52 may issue to controller 62 a corresponding request to store in storage 82 input data 74.

In response, at least in part, to this request from one or more processes 52, controller 62 may redirect and/or forward the request and/or the input data 74 to microcontroller 41. In response, at least in part, to the request and/or input data 74, circuitry 43 may encrypt input data 74, based at least in part upon one or more keys 72 stored in memory 54 and in accordance, at least in part, with one or more conventional data encryption techniques of the type described previously, to generate encrypted output data 71, as illustrated by operation 218. After circuitry 43 has generated this encrypted output data 71, circuitry 38 may issue encrypted output data 71 to controller 62. In response, at least in part, to output data 94, controller 62 may issue a request to storage 82 that corresponds to the request that was previously issued to controller 62 by one or more processes 52, with the exception that the request issued to storage 82 by controller 62 requests that output data 71 (not input data 74) be stored in storage 82. In response, at least in part, to this request from controller 62, storage 82 may store output data 71 in one or more storage devices 88 in accordance with the request from controller 62.

Alternatively or additionally, after processor 12 has loaded, at least in part, operating system 50 in memory 21, and circuitry 38 and/or controller 41 has stored in memory 54 one or more keys 72, the user of host 110 may issue a request, via user interface system 16, to one or more processes 52 to retrieve from storage 82 data 74. In response, at least in part, to this request from the user, one or more processes 52 may issue to controller 62 a corresponding request to retrieve from storage 82 data 74.

In response, at least in part, to this request from one or more processes 52, controller 62 may retrieve data 71 from storage 82, and may forward data 71 to microcontroller 41. In accordance with this embodiment, data 71 may be encrypted data that was previously generated by circuitry 43 based at least in part upon one or more keys 72 and in accordance, at least in part, with one or more conventional encryption algorithms, for example, of the type described previously.

In response, at least in part, to data 71, circuitry 43 may decrypt, based at least in part upon one or more keys 72 and in accordance, at least in part, with these one or more conventional encryption algorithms, data 71 to generate data 74, as illustrated by operation 218. After circuitry 43 has generated data 74, circuitry 38 may issue data 74 to controller 62. In response, at least in part, to data 74, controller 62 may issue data 74 to one or more processes 52, and thereafter, one or more processes 52 may present data 74 to the user in accordance with the user's data retrieval request.

After authority 145 and/or one or more processes 150 have authorized and/or issued one or more keys 70 and/or one or more keys 72, authority 145 and/or one or more processes 150 may revoke authorization of one or more keys 70 and/or one or more keys 72, as illustrated by operation 220. For example, in this embodiment, a human user (not shown) of server 140 may issue a request for such key authorization revocation to authority 145 and/or one or more processes 150 via a not shown user interface system that may be comprised in server 140. This may result in authority 145 and/or one or more processes 150 revoking the authorization of one or more keys 70 and/or one or more keys 72 by storing in server 140 and/or issuing to circuitry 38 and/or controller 41 one or more indications of such key authorization revocation. Additionally or alternatively, circuitry 38 and/or controller 41 may periodically request that authority 145 and/or one or more processes 150 indicate whether one or more keys 70 and/or one or more keys 72 have been revoked.

In response, at least in part, to an indication from authority 145 and/or one or more processes 150 of such revocation, circuitry 43 may stop encrypting and/or decrypting data. Thereafter, if circuitry 38, controller 41, and/or circuitry 43 subsequently receive from controller 62 data to be encrypted or decrypted, circuitry 38, controller 41, and/or circuitry 43 may issue, in response thereto, an error message and/or a message indicating that the requested operation is unauthorized. This may prevent controller 62 from being able to store additional data in storage 82, and also may prevent the operating system 50 from being able to present to the user decrypted data retrieved from storage 82. Additionally, in response, at least in part to the error message and/or message indicating that the requested operation is unauthorized, controller 62 may provide one or more corresponding messages to one or more processes 52. This may result in one or more processes 52 indicating to the user via system 16 an error in performing the user's requests to store data in and/or to retrieve data from storage 82 and/or that such requests are unauthorized.

For example, in this embodiment, the execution of BIOS instructions 56 by circuitry 38 and/or controller 41 may result in circuitry 38 and/or controller 41 prompting via interface 16, for example, after a reset of host 110 and/or at predetermined time intervals thereafter, the user of host 110 to supply to host 110 via interface 16 one or more valid authorization credentials 96. Alternatively or additionally, authority 145 and/or one or more processes 150 may request that circuitry 38 and/or controller 41 so prompt the user, and in response, at least in part thereto, circuitry 38 and/or controller 41 may so prompt the user.

As used herein, a "credential" means one or more strings, symbols, and/or values based, at least in part, upon which a decision may be made, at least in part, as to whether to permit an operation to be performed, such as, for example, in this embodiment, one or more user-supplied passwords. Circuitry 38 and/or controller 41 may compare one or more credentials 96 to one or more predetermined credentials stored in memory 54 and/or memory 45. If one or more credentials 96 match these one or more predetermined credentials, circuitry 38 and/or controller 41 may determine that credentials 96 are valid. Conversely, if one or more credentials 96 do not match these one or more determined credentials (or if the user fails to supply credentials 96 within a predetermined time period), circuitry 38 and/or controller 41 may determine that the user has failed to supply one or more valid authorization credentials. This may result in circuitry 38 and/or controller 41 requesting that authority 145 and/or one or more processes 150 revoke authorization of one or more keys 70 and/or one or more keys 72. In response to this request, one or more processes 150 and/or authority 145 may revoke such authorization in the manner previously described.

Alternatively or additionally, circuitry 38 and/or controller 41 may forward credentials 96 to authority 145 and/or one or more processes 150. Authority 145 and/or one or more processes 150 may compare one or more credentials 96 to one or more predetermined credentials stored in server 140. If one or more credentials 96 match these one or more predetermined credentials, authority 145 and/or one or more processes 150 may determine that credentials 96 are valid (i.e., that the user has supplied valid authorization credentials). Based at least in part upon this determination, authority 145 and/or one or more processes 150 may authorize and/or issue one or more keys, for example, after reset of host 110 and/or prior to expiration of one or more keys 70 and/or 72. Conversely, if one or more credentials 96 do not match these one or more determined credentials (or if the user fails to supply credentials 96 within a predetermined time period), authority 145 and/or one or more processes 150 may determine that the user has failed to supply one or more valid authorization credentials, and may revoke authorization of one or more keys 70 and/or one or more keys 72 in the manner described previously.

Also conversely, if as a result of operation 202, microcontroller 41 and/or circuitry 38 determines that microcontroller 41 and/or circuitry 38 is unable to communicate with server 140, remote authority 145, and/or one or more agents 150, circuitry 38 and/or controller 41 may determine whether to permit circuitry 43 to encrypt and/or decrypt, in the manner previously described, data to be stored in or retrieved from storage 82, as illustrated by operation 206. For example, circuitry 38 and/or controller 41 may examine one or more values that may be stored in memory 54, memory 45, and/or one or more registers (not shown) in circuitry 38 and/or controller 41. These one or more values may indicate whether authority 145 has authorized circuitry 43 to encrypt data stored in storage 82 and/or to decrypt data retrieved from storage 82. These one or more values may be stored in memory 54, memory 45, and/or these one or more registers by controller 41 and/or circuitry 38, in response, at least in part, to one or more commands received from authority 145. If the one or more values indicate that such data encryption and/or decryption has been authorized, and one or more keys previously authorized by authority 145 and/or one or more processes 150 are stored in memory 54, circuitry 38 and/or controller 41 may determine that authority 145 has authorized such data encryption and/or decryption. Conversely, if the one or more values indicate that such data encryption and/or decryption has not been authorized, or one or more previously authorized keys are not stored in memory 54, circuitry 38 and/or controller 41 may determine that authority 145 has not authorized such data encryption and/or decryption.

After circuitry 38 and/or controller 41 have made this determination, circuitry 38 and/or controller 41 may proceed in accordance with the determination, as illustrated by operation 208. For example, if circuitry 38 and/or controller 41 determine, as a result of operation 206, that such encryption and/or decryption has been authorized, circuitry 43 may encrypt and/or decrypt data, as part of operation 208, in the manner previously described. Conversely, if circuitry 38 and/or controller 41 determine, as a result of operation 206, that such encryption and/or decryption has not been authorized, circuitry 43 may not, as part of operation 208, so encrypt and/or decrypt data. Instead, controller 41 and/or circuitry 38 may request that controller 62 store data in storage 82, in response to one or more storage requests from one or more processes 52, without it being encrypted by circuitry 43. Likewise, controller 41 and/or circuitry 38 may request that controller 62 retrieve data from storage 82 and issue it to one or more processes 52, in response to one or more data retrieval requests from one or more processes 52, without it being decrypting by circuitry 43. Controller 62 may act in accordance with such requests from circuitry 38 and/or controller 41.

Additionally or alternatively, although not shown in FIG. 2, prior to executing operation 214 and/or operation 218, circuitry 38 and/or controller 41 may determine, substantially in the manner of operation 206, whether to permit circuitry 43 to encrypt and/or decrypt data in the manner previously described. Depending, at least in part, upon the outcome of such determination, operations 214 and/or 218 may be carried or not carried out, as appropriate.

In this embodiment, circuitry 38, integrated circuit 39, controller 41, and/or circuitry 43 may execute the operations described herein as being executed by circuitry 38, integrated circuit 39, controller 41, and/or circuitry 43 as a result of the execution by circuitry 38, integrated circuit 39, controller 41, and/or circuitry 43 of BIOS instructions 56. Circuitry 38, integrated circuit 39, controller 41, and/or circuitry 43 execute these operations independent of the operating system 50 and/or the operating system instructions executed by processor 12. For example, in order to carry out these operations, circuitry 38, integrated circuit 39, controller 41, and/or circuitry 43 do not execute any part of operating system 50 and/or the operating system instructions executed by processor 12. As result, for example, circuitry 38 and/or controller 41 may be capable of executing operation 204 independent of operating system 50, one or more processes 52, and/or the operating system instructions executed by processor 12.

Authority 145 and/or one or more processes 150 may retain and store in server 140 a copy of each of the keys authorized and/or issued by authority 145 and/or one or more processes 150. This may permit various administrative and/or management functions to be carried out, such as, as may facilitate decrypting of data stored in storage 82 in order to respond to a subpoena issued by a legal authority requiring production of such data.

Thus, a system embodiment may comprise a circuit board. The circuit board may comprise a circuit card slot and a circuit card that is capable of being inserted into the circuit card slot. The circuit card may comprise circuitry to, in response, at least in part, to a request to store input data in storage, encrypt, based least in part upon at least one key, the input data to generate output data to store in the storage. The at least one key may be authorized by a remote authority. Additionally or alternatively, the circuitry may be to, in response, at least in part, to a request to retrieve the input data from the storage, decrypt, based at least in part upon the at least one key, the output data.

In this system embodiment, data may be encrypted and stored in, and/or retrieved from the storage and decrypted, independent of an operating system, based upon, at least in part, one or more keys authorized by a remote authority. Advantageously, the features of this system embodiment may permit this system embodiment to be able to overcome the aforesaid and/or other disadvantages of the aforesaid conventional arrangement.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

Additional modifications are also possible. Accordingly, the claims are intended to cover all such equivalents.

What is claimed is:

1. A method comprising:
requesting, at a system, at least one encryption key from a remote authority located in a remote server over a communication network, the at least one encryption key being generated and permitted by the remote authority, the system being geographically remote from and communicatively coupled to the remote authority in the remote server;
performing, at the system, a cryptographic operation on data using the at least one encryption key, the cryptographic operation being performed in response, at least in part, to a request to store the data in storage of the system or to retrieve data from the storage;
prior to performing the cryptographic operation, determining whether the system is able to communicate with the remote authority;
if the system is able to communicate with the remote authority, requesting by the system, permission from the remote authority to use the at least one encryption key;
if the system is unable to communicate with the remote authority, determining by the system not to permit the cryptographic operation;
periodically requesting, at the system, that the remote authority indicate whether the at least one encryption key has been revoked; and
upon receipt, from the remote authority, an indication of revoking the at least one encryption key:
ceasing performing, at the system, the cryptographic operation on data using the at least one encryption key, and
upon receiving additional data for the cryptographic operation, issuing a message indicating an error or indicating that the requested operation is unauthorized.

2. The method of claim 1, further comprising:
receiving, via the communication network, the at least one encryption key issued from the remote authority, by logic capable of performing the cryptographic operations.

3. The method of claim 1, further comprising:
after use of the at least one encryption key has been permitted by the remote authority, receiving permission from the remote authority to use at least one other encryption key; and performing cryptographic operations on other data based, at least in part, upon the at least one other encryption key.

4. The method of claim 1, wherein:
the revoking of the at least one encryption key being in response, at least in part, to one or more of a request for revocation of one or more encryption keys or failure of a user to supply one or more valid authorization credentials.

5. The method of claim 1, further comprising:
receiving permission from the remote authority, based at least in part upon one or more credentials provided by a user, to use the at least one encryption key.

6. An apparatus comprising:
a first circuitry to request at least one encryption key from a remote authority located in a remote server over a communication network, the at least one encryption key being generated and permitted by the remote authority, the first circuitry being geographically remote from and communicatively coupled to the remote authority in the remote server;
a second circuitry to perform a cryptographic operation on data using the at least one encryption key, the cryptographic operation being performed in response, at least in part, to a request to store the data in local storage or to retrieve data from the local storage; and
a third circuitry to periodically request that the remote authority indicate whether the at least one encryption key has been revoked;
wherein:
prior to performance of the cryptographic operation, the apparatus to determine whether the apparatus is able to communicate with the remote authority;
if the apparatus is able to communicate with the remote authority, the apparatus to request, permission from the remote authority to use the at least one encryption key;
if the apparatus is unable to communicate with the remote authority, the apparatus to determine not to permit the cryptographic operation; and
upon receipt, from the remote authority, an indication of revoking the at least one encryption key:
the second circuitry to cease performing, at the apparatus, the cryptographic operation on data using the at least one encryption key, and
upon receiving additional data for the cryptographic operation, the apparatus to issue a message indicating an error or indicating that the requested operation is unauthorized.

7. The apparatus of claim 6, wherein the second circuitry to receive, via the communication network, the at least one encryption key issued from the remote authority.

8. The apparatus of claim 6, wherein the second circuitry to perform cryptographic operations on other data based, at least in part, upon at least one other encryption key permitted for use by the remote authority.

9. The apparatus of claim 6, wherein the revoking of the at least one encryption key being in response, at least in part, to one or more of a request for revocation of one or more encryption keys or failure of a user to supply one or more valid authorization credentials.

10. The apparatus of claim 6, wherein the remote authority to permit use of the at least one encryption key, based at least in part upon one or more credentials provided by a user.

11. The apparatus of claim 6, further comprising logic, the logic to determine whether the logic can communicate with the remote authority prior to performance of the cryptographic operation, wherein:

if the logic can communicate with the remote authority, the first circuitry to request permission from the remote authority to use the at least one encryption key; and
if the logic cannot communicate with the remote authority, the second circuitry to determine not to permit the cryptographic operation.

12. A system comprising:
a storage device;
a first circuitry to request at least one encryption key from a remote authority located in a remote server over a communication network, the at least one key being generated and permitted for use by the remote authority, the first circuitry being geographically remote from and communicatively coupled to the remote authority in the remote server;
a second circuitry to perform a cryptographic operation on data using the at least one encryption key, the cryptographic operation being performed in response, at least in part, to a request to store the data in the storage device or to retrieve data from the storage device; and
a third circuitry to periodically request that the remote authority indicate whether the at least one encryption key has been revoked;
wherein:
prior to performance of the cryptographic operation, the system to determine whether the system is able to communicate with the remote authority;
if the system is able to communicate with the remote authority, the system to request permission from the remote authority to use the at least one encryption key;
if the system is unable to communicate with the remote authority, the system to determine not to permit the cryptographic operation; and
upon receipt, from the remote authority, an indication of revoking the at least one encryption key:
the second circuitry to cease performing, at the apparatus, the cryptographic operation on data using the at least one encryption key, and
upon receiving additional data for the cryptographic operation, the system to issue a message indicating an error or indicating that the requested operation is unauthorized.

13. The system of claim 12, wherein the second circuitry to receive, via the communication network, the at least one encryption key issued from the remote authority.

14. The system of claim 12, wherein the second circuitry to perform cryptographic operations on other data based, at least in part, upon at least one other encryption key permitted for use by the remote authority.

15. The system of claim 12, wherein the revoking being in response, at least in part, to failure of a user to supply one or more valid authorization credentials.

16. The system of claim 12, wherein the remote authority to permit use of the at least one encryption key, based at least in part upon one or more credentials provided by a user.

17. The system of claim 12, further comprising logic, the logic to determine whether the logic can communicate with the remote authority prior to performance of the cryptographic operation, wherein:
if the logic can communicate with the remote authority, the first circuitry to request permission by the remote authority to use the at least one encryption key; and
if the logic cannot communicate with the remote authority, the second circuitry to determine not to permit the cryptographic operation.

18. At least one non-transitory computer-readable storage medium having stored thereon data representing sequences of instructions that, when executed by one or more processors, cause the one or more processors to perform operations comprising:

requesting, at a system, at least one encryption key from a remote authority located in a remote server over a communication network, the at least one encryption key being generated and permitted by the remote authority, the system being geographically remote from and communicatively coupled to the remote authority in the remote server;

performing, at the system, a cryptographic operation on data using the at least one encryption key, the cryptographic operation being performed in response, at least in part, to a request to store the data in storage of the system or to retrieve data from the storage;

prior to performing the cryptographic operation, determining whether the system is able to communicate with the remote authority;

if the system is able to communicate with the remote authority, requesting by the system, permission from the remote authority to use the at least one encryption key;

if the system is unable to communicate with the remote authority, determining by the system not to permit the cryptographic operation;

periodically requesting, at the system, that the remote authority indicate whether the at least one encryption key has been revoked; and upon receipt, from the remote authority, an indication of revoking the at least one encryption key:

ceasing performing, at the system, the cryptographic operation on data using the at least one encryption key, and upon receiving additional data for the cryptographic operation, issuing a message indicating an error or indicating that the requested operation is unauthorized.

19. The medium of claim 18, further comprising instructions that, when executed by the one or more processors, cause the one or more processors to perform operations comprising:

receiving, via the communication network, the at least one encryption key issued from the remote authority, by logic capable of performing the cryptographic operations.

20. The medium of claim 18, further comprising instructions that, when executed by the one or more processors, cause the one or more processors to perform operations comprising:

after use of the at least one encryption key has been permitted by the remote authority, receiving permission from the remote authority to use at least one other encryption key; and performing cryptographic operations on other data based, at least in part, upon the at least one other encryption key.

21. The medium of claim 18, wherein:

the revoking of the at least one encryption key being in response, at least in part, to one or more of a request for revocation of one or more encryption keys or failure of a user to supply one or more valid authorization credentials.

22. The medium of claim 18, further comprising instructions that, when executed by the one or more processors, cause the one or more processors to perform operations comprising:

receiving permission from the remote authority, based at least in part upon one or more credentials provided by a user, to use the at least one encryption key.

* * * * *